United States Patent [19]

Minagawa

[11] Patent Number: 5,542,110
[45] Date of Patent: Jul. 30, 1996

[54] DMA CONTROLLER WHICH RELEASES BUSES TO EXTERNAL DEVICES WITHOUT RELINQUISHING THE BUS UTILITY RIGHT

[75] Inventor: Tsutomu Minagawa, Kanagawa-ken, Japan

[73] Assignee: Kabushiki Kaisha Toshiba, Kawasaki, Japan

[21] Appl. No.: 989,521

[22] Filed: Dec. 11, 1992

[30] Foreign Application Priority Data

Dec. 13, 1991 [JP] Japan .................................. 3-330411

[51] Int. Cl.[6] ........................................................ G06F 13/28
[52] U.S. Cl. ........................... 395/287; 395/845; 395/550
[58] Field of Search .................................. 395/325, 275, 395/425, 725, 842, 845, 848, 868, 287, 733, 740, 550

[56] References Cited

U.S. PATENT DOCUMENTS

| | | | |
|---|---|---|---|
| 4,688,166 | 8/1987 | Schneider | 395/275 |
| 4,729,090 | 3/1988 | Baba | 395/425 |
| 4,975,832 | 12/1990 | Saito et al. | 395/425 |
| 5,072,365 | 12/1991 | Burgess et al. | 395/725 |
| 5,195,185 | 3/1993 | Marenin | 395/325 |
| 5,278,965 | 1/1994 | Fujihira et al. | 395/425 |
| 5,287,486 | 2/1994 | Yamasaki et al. | 395/425 |

*Primary Examiner*—Jack B. Harvey
*Assistant Examiner*—Glenn A. Auve
*Attorney, Agent, or Firm*—Foley & Lardner

[57] ABSTRACT

A DMA controller having an acceptance circuit, a transfer control circuit and a release ordering circuit. The acceptance circuit receives a temporary bus release request and its withdrawal from an external device, once the DMA controller acquires a bus utility right from a CPU. The transfer control circuit then interrupts bus transfer cycles under operation and holds the bus transfer parameters so as to allow a restarting of the bus transfer cycle after the withdrawal is accepted. The release ordering circuit informs the external device of the permission of temporary bus use. So, buses are temporarily released against the external device by the DMA controller of the present invention without passing through the CPU.

18 Claims, 5 Drawing Sheets

DMA CONTROLLER WHICH RELEASES BUSES TO EXTERNAL DEVICES WITHOUT RELINQUISHING THE BUS UTILITY RIGHT

BACKGROUND OF THE INVENTION

1. Field of the invention

This invention relates to a DMA (Direct memory access) controller which has a function to temporarily release buses against external devices, under the condition in which the DMA controller holds a bus utility right obtained from a CPU.

2. Description of the prior art

A conventional DMA controller has a function to efficiently transfer a large amount of data at a high speed, without going by way of a CPU. In this instance, the DMA controller controls a direct data transfer between external devices, after having acquired a bus utility right from the CPU. In such a DMA controller, there are two kinds of transfer modes, one of which is a single transfer mode, and the other of which is a block (burst) transfer mode. The usage of buses in these transfer modes are different from each other.

In a single transfer mode, acquisition and relinquishment of a bus utility right between a CPU and a DMA controller is carried out at every data transfer. For example, the data transfer is carried out with the timing shown in FIG. 5.

Figure 5:
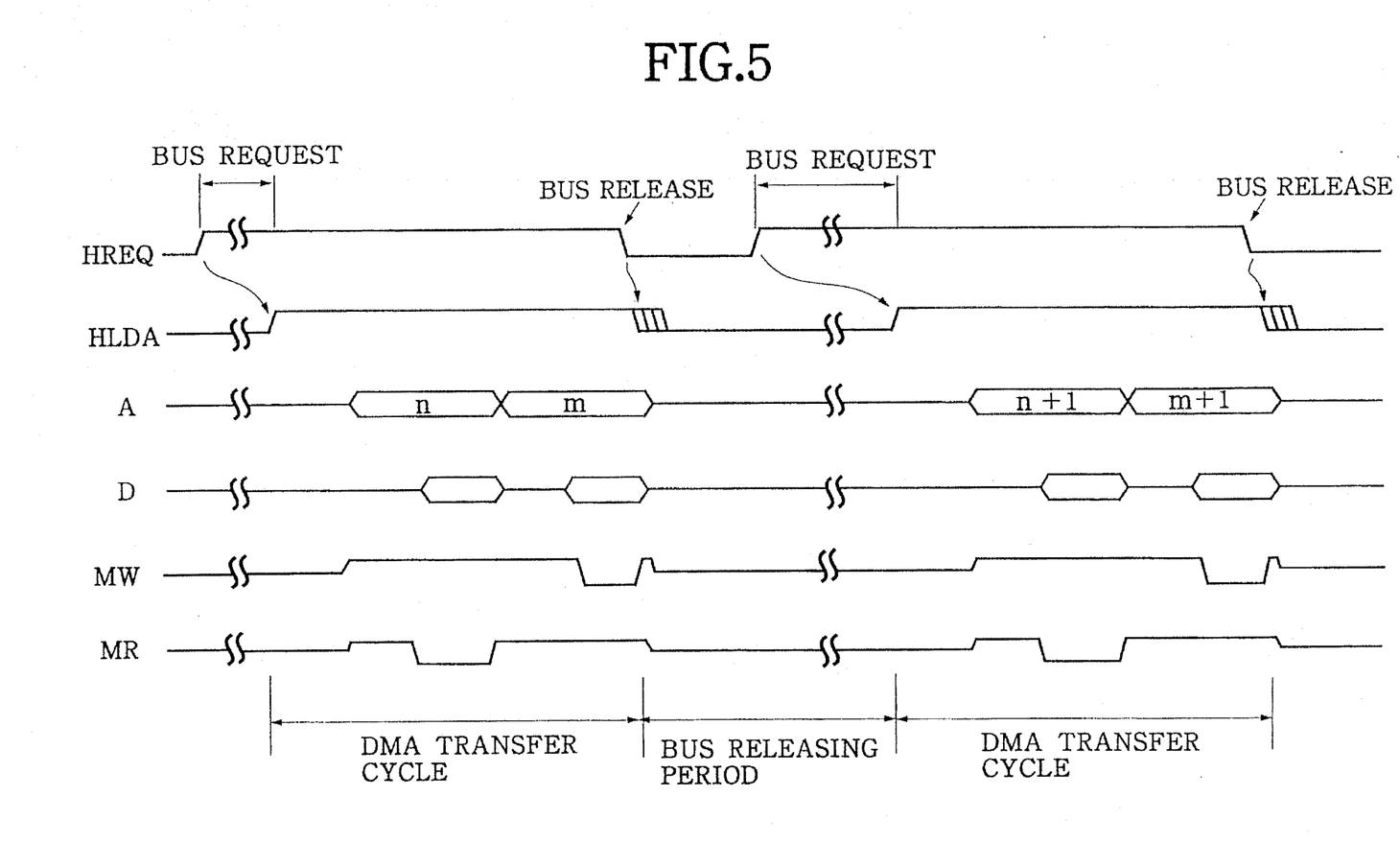
FIG. 5 is a timing chart showing the single transfer mode according to a prior art DMA controller.

The DMA controller, which is operated with the timing shown in FIG. 5, has a counter in which a transfer word number showing the amount of transfer data is stored. In the case where more than one of transfer words are stored in this counter and a transfer request signal (DREQ, not shown in the figure) is supplied from an external device into the DMA controller, the DMA controller sends a request signal for the bus utility right (HREQ) to the CPU to acquire the bus utility right. When the CPU accepts the request, it sends an enabling signal (HLDA) and temporarily gives the bus utility right to the DMA controller.

Once the DMA controller has acquired the bus utility right as mentioned above, it generates address information (A) and control signals for data (D) reading or writing (MR or MW), which are the similar ones as those generated from the CPU for a data transfer. Thus, the DMA controller executes one DMA transfer cycle.

Although the transfer request signal (DREQ) is in an active state, the DMA controller gives the bus utility right back to the CPU by withdrawing the bus utility request after one bus transfer cycle is completed. As a result, buses are released from the DMA controller, and so, the CPU and other external devices are allowed to use the buses again.

In that situation, however, the transfer for all the data to be transferred has not been completed yet. Therefore, the DMA controller should again send the request signal for the bus utility right to the CPU, and acquires the right to execute the second DMA transfer cycle.

As described above, in the single transfer mode, the DMA controller repeats the acquisition and relinquishment of the bus utility right against the CPU at every transfer cycle until the transfer word number counter becomes "0", and thus completing the data transfer.

The single transfer mode is used when one of the external devices, between which data are exchanged, has a lower access speed than those of the other devices. Buses are released at every one transfer cycle in this mode. Therefore, a particular external device cannot be allowed to occupy the buses for a long time. The buses are then available for a plurality of external devices, thus allowing distributive use of the buses.

On the other hand, in the single transfer mode, a certain period of time is needed to acquire and to relinquish the bus utility right at every one transfer cycle, besides the data transfer time. In other words, the overhead time for a data transfer becomes large in this mode, thus lowering the availability factor of the buses.

On the contrary, in a block transfer mode, once a DMA controller acquires a bus utility right to begin a DMA transfer cycle, the bus is occupied by the DMA controller until the transfer of all the data to be transferred is complete. In this case, the transfer word number counter becomes "0" to complete the data transfer.

This block transfer mode is utilized when the access speeds of two external devices, between which data are transferred, are high and data are transferred in a block unit. In this case, once a transfer cycle has begun, the buses are not allowed to be released until the data transfer is complete. A high availability factor is therefore obtained from this mode.

However, once a transfer begins, the DMA controller continues to occupy the buses. Therefore, to use the buses temporarily becomes difficult for other external devices. This fact causes a disadvantage for the distributive use of buses.

As explained above, in a prior art DMA controller, temporary release of buses is not allowed without taking steps to acquire and relinquish the bus utility right. This fact decreases the availability factor of buses, and causes difficulty for the distributive use of buses.

SUMMARY OF THE INVENTION

This invention has been made to overcome the above mentioned problems of the prior art DMA controller.

Therefore, the main objective of the present invention is to provide a DMA controller which is able to temporarily release buses without taking steps to acquire and relinquish the bus utility right against a CPU.

Another objective of the present invention is to improve, in a DMA controller, the whole efficiency of bus utility, including the distributive use of buses and the bus transfer efficiency.

The feature of the present invention provides a DMA controller which is comprised of the following: an acceptance circuit which receives a temporary bus release request from an external device during the execution of bus transfer cycles after having acquired a bus utility right from a CPU; a transfer control circuit which holds the transfer parameters regarding the present bus cycle under operation by detecting the input of said temporary bus release request into said acceptance circuit, and also interrupts said bus transfer cycles so as to temporarily release buses against said external device; and a release ordering circuit for permitting temporary bus release against said external device from which said temporary bus release request is output, after said bus transfer cycles have been interrupted by said transfer control circuit.

According to said feature, the acceptance circuit is capable of receiving a temporary bus release request from an external device after the DMA controller has acquired a bus utility right from the CPU. Having detected the acceptance of said request, the transfer control circuit interrupts the execution of bus transfer cycles in the DMA controller. In this instance, the transfer parameters used to execute the bus transfer cycles are held in the transfer control circuit, so that the DMA controller is capable of restarting the bus transfer cycles after said temporary bus release request is withdrawn. When said transfer control circuit interrupts the bus transfer cycles, the release ordering circuit informs the external device of the temporary bus release. As a result, the DMA controller may temporarily release buses against the external device without taking any procedure to the CPU.

These and other objectives, features, and advantages of the present invention will be more apparent from the following description of preferred embodiments, taken in conjunction with the accompanying drawings.

DETAILED DESCRIPTION OF PREFERRED EMBODIMENTS

Figure 1:
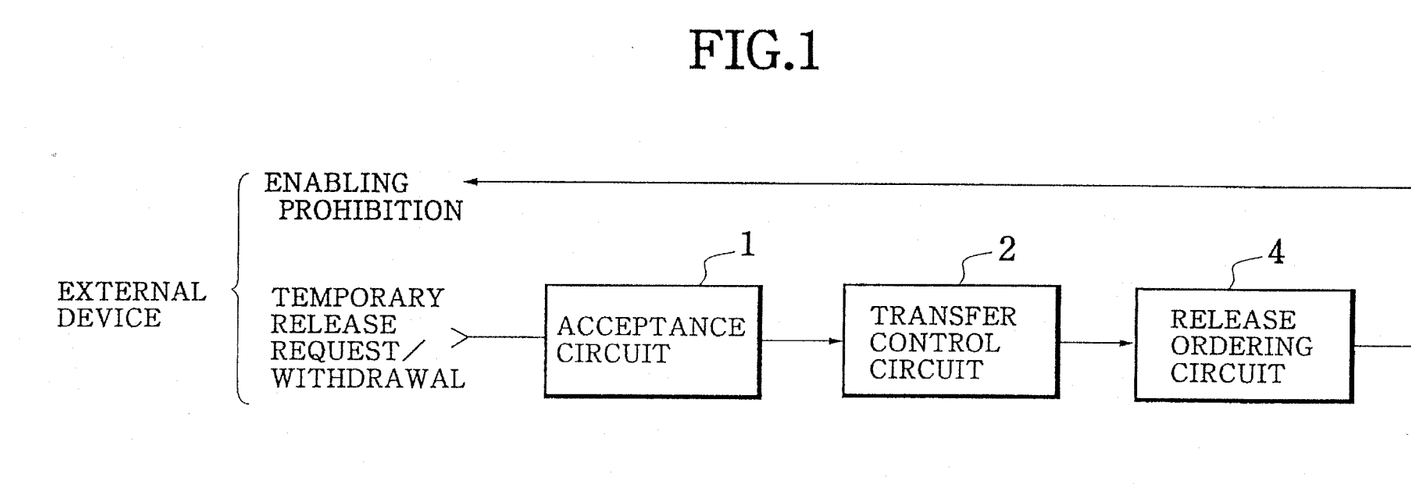
FIG. 1 is a block diagram showing the essential structure of a DMA controller according to one embodiment of the present invention.

As shown in FIG. 1, a DMA controller includes an acceptance circuit 1, a transfer control circuit 2 and a release ordering circuit 4. Once the DMA controller has acquired a bus utility right from a CPU (not shown), circuit 1 accepts a temporary bus release request from external devices such as memories, I/O devices, etc., which are able to use buses. After the buses are released to an external device, the acceptance circuit 1 also accepts from the external device the withdrawal of the temporary bus release request. These accepts are then given to the transfer control circuit 2.

Once the acceptance circuit 1 accepts the temporary release request, the transfer control circuit 2 interrupts the bus transfer cycle under operation, allowing an address bus, data bus, and control lines to be in a high impedance state. As a result, the DMA controller is disconnected from the address bus, data bus, and control lines. The transfer control circuit 2 then notifies the release ordering circuit 4 that the buses are disconnected from the DMA controller.

On the other hand, when the acceptance circuit 1 accepts the withdrawal of the temporary release request, the transfer control circuit 2 connects the address bus, the data bus, and the control lines with the DMA controller, allowing them to return to the original state before the interruption occurred. The DMA controller re-starts the transfer operation from the bus transfer cycle next to the interrupted cycle, according to the transfer parameters which have been held in transfer control circuit 2.

When the buses are disconnected from the DMA controller by the transfer control circuit 2, the release ordering circuit 4 instructs the external device, from which the temporary bus release request is generated, of the permission to use the buses. On the contrary, when the buses are connected with the DMA controller by the transfer control circuit 2, the release ordering circuit 4 instructs the external device of the prohibition to use the buses, because these buses are in a non-release condition.

Figure 2:
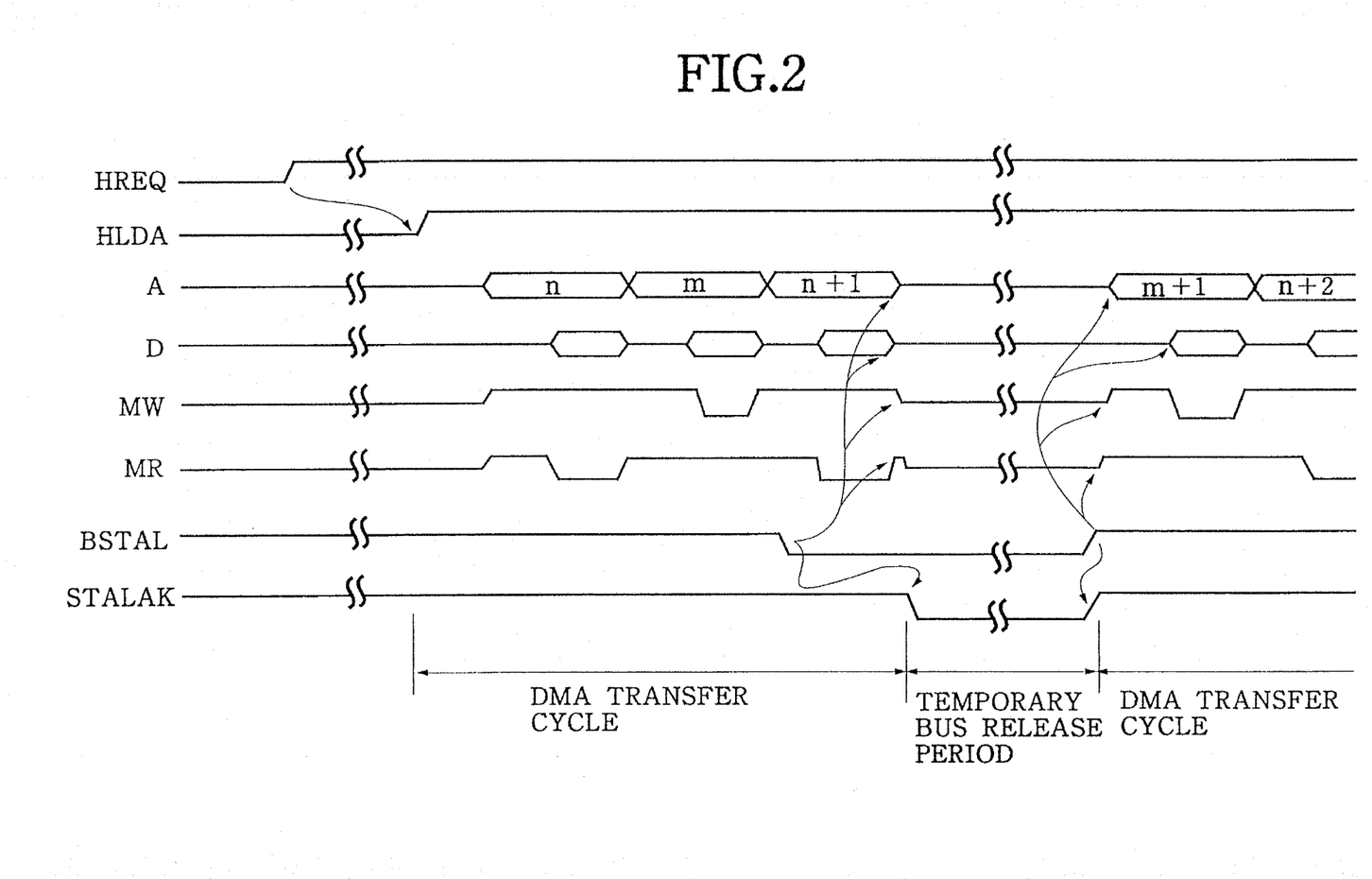
FIG. 2 is a timing chart showing the bus transfer operation of the DMA controller shown in FIG. 1.

Next, the transfer operation in a block transfer mode will be described in the system structure with referring to FIG. 2.

At first, the DMA controller sends a request signal (HREQ) for the bus utility right to the CPU in order to acquire the bus utility right. When this signal is accepted by the CPU, an enabling signal (HLDA) is given to the DMA controller from the CPU, thus allowing the DMA controller to acquire the bus utility right. Then, the DMA controller produces read/write signals for address information to execute a data (D) transfer, according to predetermined transfer parameters.

If a bus release request signal (BSTAL), which is in an active state, is given to the acceptance circuit 1 from an external device and accepted during the execution of bus transfer cycles by the DMA controller as mentioned above, the bus transfer cycle under operation is interrupted. The address bus, data bus, and control lines then become set to a high impedance state, thus disconnecting the buses from the DMA controller. As a result, the buses are released, and the enabling signal (STALAK) is made active. This active signal is then given to the external device in which the bus release request signal was generated. On the other hand, the transfer parameters regarding the bus transfer cycle, which has been executed before the interruption, are stored in transfer control circuit 2.

In the DMA controller shown in FIG. 1, buses can be temporarily released to external devices as mentioned above, without taking steps to relinquish the bus utility right against the CPU.

When the use of buses by an external device is completed, the external device should withdraw the temporary bus release request. In this case, the bus release request signal (BSTAL) is made inactive and given to the acceptance circuit 1. When the acceptance circuit 1 accepts the withdrawal, the address bus, data bus, and control bus are connected with the DMA controller, so that the DMA controller returns to the original state before the interruption occurred. The buses, therefore, become unreleased for external devices. This state is notified to the external device by making the enabling signal (STALAK) inactive. Once the buses are connected with the DMA controller again as mentioned above, the DMA controller restarts the bus transfer operation at the cycle next to the interrupted cycle, according to the transfer parameters held in the transfer control circuit 2.

It is instructive to compare the bus transfer operation of this invention, in which a block transfer mode is used as mentioned above, with the prior bus transfer operation using a single transfer mode. This comparison will be carried out under the following conditions: the CPU executes one bus cycle for one clock, which is the shortest cycle; the DMA controller executes one bus cycle for two DMA clocks (4 CPU clocks), which is also the shortest cycle; the overhead, which begins from the output of a bus utility right request signal and completes at the output of an enabling signal, requires 7 clocks; and there is no overhead required to relinquish the buses. Under the above conditions, the prior art device requires 15 clocks in all, including 7 clocks for the DMA controller to obtain the bus utility right for one transfer and 8 clocks for executing one bus transfer. As a result, the bus availability factor becomes 53% in the prior art device.

On the other hand, the DMA controller of the present invention requires 9 clocks in all, including 7 clocks for the DMA controller to obtain the bus utility right and 7 clocks for the temporary bus release. This number of clocks, that is, 9 clocks, may be ignored, when data to be transferred become large and so a large number of bus transfer cycles are required. This is because the 9 clocks required for the temporary bus release is small enough and can be ignored as compared with the whole amount of transfer cycles. As a result, nearly 100% of bus availability factor can be obtained according to the present invention.

As described above, it is possible in the present invention to increase the bus availability factor without giving up the ease of bus distributive use.

Next, another embodiment, in which a DMA controller of the present invention is applied for the data transfer in a graphic system, will be described with referring to FIG. 3 which shows the system structure.

Figure 3:
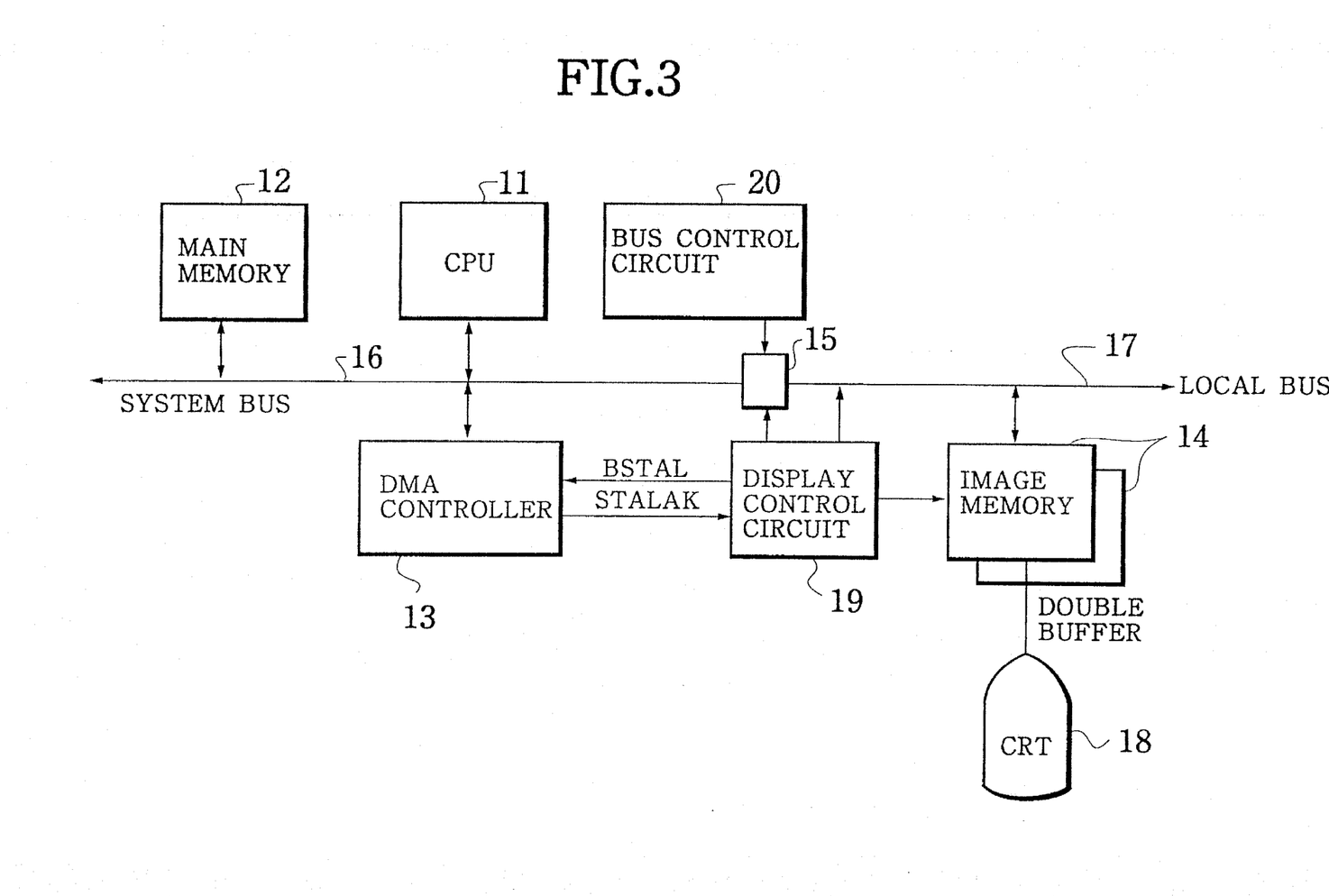
FIG. 3 is a block diagram showing the structure of a system in which the DMA controller shown in FIG. 1 is incorporated.

In FIG. 3, a CPU 11 calculates and generates image data, and stores them into a main memory 12 as image data. When a certain amount of data are stored in the main memory 12, they should be transferred into an image memory 14 through a DMA controller 13.

Bus switching circuit 15 is provided in order to disconnect a local bus 17 from a system bus 16, which is used in the CPU 11 to calculate and generate image data. On the other hand, the local bus 17 is used to generate addresses in a display control circuit 19 or to implement the clear control of image memory 14, in order to refresh the content of the image memory 14 onto a CRT 18.

In the case where the DMA controller 13 transfers image data into the image memory 14, a bus control circuit 20 confirms that the buses are not used by the display control circuit 19, which has the priority to use the buses. When the buses are not used by the display control circuit 19, the bus control circuit 20 connects the system bus 16 with the local bus 17 through the bus switching circuit 15. After this connection, the CPU 11 activates the DMA controller 13 by means of software.

By taking steps to acquire a bus utility right, the DMA controller 13 obtains the bus utility right from the CPU 11. Then, the DMA controller 13 begins a transfer operation between the main memory 12 and the image memory 14, according to parameters set by the CPU 11 before the DMA activation. In the case where a two port memory is used to be the image memory 14, data should be transferred almost every 10 μs to the SAM port in the image memory 14, in order to practice the display refresh onto the CRT 18. Therefore, the display control circuit 19 must use the local bus 17 for every 10 μs. This interval may change, of course, depending upon the resolution of the display and the display system used.

The display control circuit 19 then demands the temporary bus release against the DMA controller 13 by means of the BSTAL signal. In response to this demand, the DMA controller 13 stops executing the transfer cycle after the present transfer cycle under operation is completed. Then, the DMA controller 13 makes the address bus, data bus, and control bus to a high impedance state so as to release these buses temporarily. The DMA controller 13 also notifies the display control circuit 19 of this release.

After receiving permission to have a bus utility right, the display control circuit 19 outputs addresses of the image memory 14 on the address bus, and then transfers data into the SAM port. At the same time, the display control circuit 19 executes a refresh operation for one memory group in the double buffer. Having completed the operation, the display control circuit 19 withdraws the BSTAL request. As a result, the DMA controller 13 restarts the transfer cycle at the point interrupted before. The whole operation mentioned above will be repeated every 10 μs.

Figure 4:
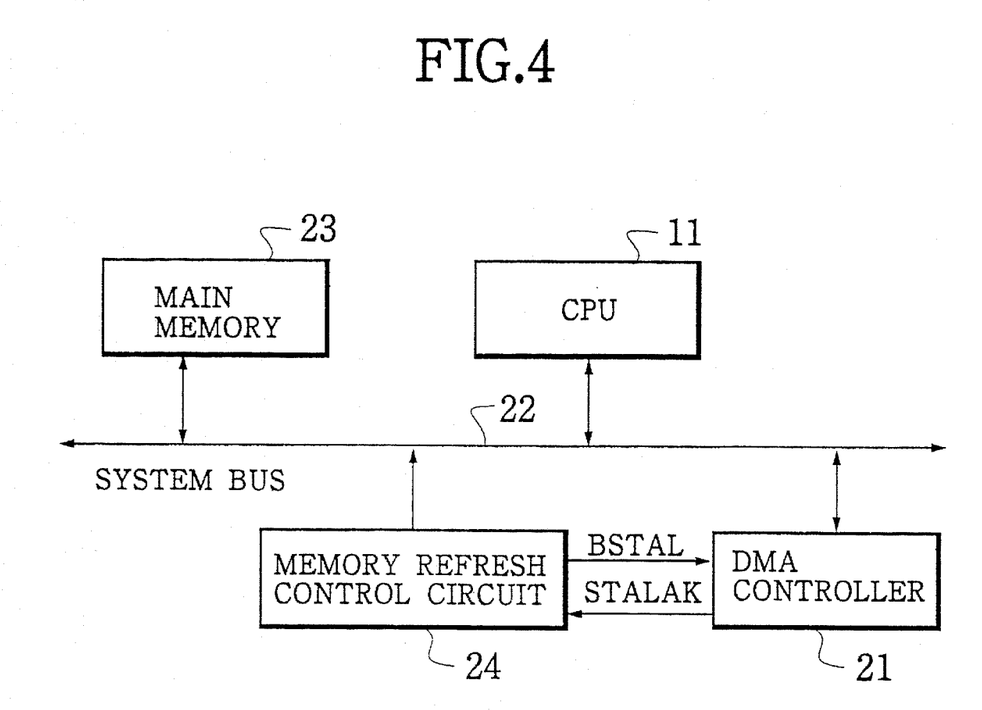
FIG. 4 is a block diagram showing the structure of another system in which the DMA controller shown in FIG. 1 is incorporated.

FIG. 4 shows the system structure in which the DMA controller 21 of the present invention is combined with a memory refresh control circuit 24. The memory refresh control circuit 24 is used to refresh a main memory 23 which is connected with a system bus 22. The basic operation of this embodiment is almost the same as that of the system shown in FIG. 3. In other words, in order to execute a memory refresh in this system, the system bus 22 is temporarily released from the DMA controller 21, which is under a transfer operation.

As described above, the DMA controller of this invention can be incorporated into various systems. In these systems, the DMA controller has a function to temporarily release a bus utility right, without taking steps to acquire and relinquish the bus utility right against the CPU. Therefore, in the case where an external device requests to use buses temporarily, the DMA controller is able to respond to this request directly without passing it through to the CPU. The overhead time, which is required to exchange the bus utility right between the DMA controller and the CPU, is greatly reduced, and so, the bus availability factor is largely increased.

In summary, once the DMA controller according to the present invention acquires a bus utility right from a CPU, it is capable of temporarily releasing buses against the external devices, without taking any procedure against CPU. Thus, the overhead required to interrupt the bus transfer cycle in the DMA controller becomes very small. When buses are used distributively by many external devices, the overhead caused by this use becomes so small that it may be ignored. As a result, the DMA controller of the present invention provides a high bus availability factor, in spite of the distributive use of buses.

What is claimed is:

1. A direct memory access controller (DMA) for a data processing system having a central processing unit (CPU), memories, external devices, and buses for alternately connecting between said memories, said CPU, and said external devices, said DMA controller comprising:

an acceptance circuit for receiving a temporary bus release request transferred from one of said external devices in order to permit use of said buses during an execution of a bus transfer cycle under a condition that said DMA controller has acquired a bus utility right from said CPU, and for receiving a withdrawal request of said temporary bus release request transferred from said one of said external devices;

a transfer control circuit for storing transfer parameters relating to said execution of said bus transfer cycle when said acceptance circuit receives said temporary bus release request transferred from one of said external devices, and for interrupting said bus transfer cycle in order to temporarily release said buses for said one of said external devices; and a release ordering circuit for permitting a temporary bus release to said one of said external devices after said bus transfer cycle have been interrupted by said transfer control circuit, wherein when said DMA controller has acquired said bus utility right from said CPU, said transfer control circuit executes again said bus transfer cycle only when said acceptance circuit receives said withdrawal request relating to said temporary bus release request transferred from said one of said external devices.

2. The DMA controller as claimed in claim 1, wherein said transfer control circuit executes said interruption of said bus transfer cycle when a current cycle in said bus transfer cycle is completed.

3. The DMA controller as claimed in claim 1, wherein said transfer control circuit executes said interruption of said bus transfer cycle when a current cycle in said bus transfer cycle is completed, and executes said bus transfer cycle again from a cycle immediately after said current cycle of said bus transfer cycle.

4. The DMA controller as claimed in claim 1, wherein said release ordering circuit indicates a prohibition of use of said buses to said external device when said bus transfer cycle which has been interrupted by said transfer control circuit is re-started.

5. The DMA controller as claimed in claim 1, wherein said buses include an address bus, a data bus, and control lines.

6. The DMA controller as claimed in claim 1, wherein said transfer control circuit interrupts said bus transfer cycle by setting said buses to a high impedance state in order to disconnect said buses from said DMA controller.

7. The DMA controller as claimed in claim 1, wherein said external devices include memories and I/O devices.

8. The DMA controller as claimed in claim 1, wherein said one of said external devices which has transferred said temporary bus release request is a display control circuit which drives a CRT.

9. The DMA controller as claimed in claim 1, wherein said one of said external devices which has transferred said temporary bus release request is a memory refresh control circuit to refresh a main memory connected with a system bus.

10. The DMA controller as claimed in claim 1, wherein when said CPU requests to re-acquire said bus utility right after said CPU has given said bus utility right to said DMA controller and said DMA controller has permitted said temporary bus release to said one of said external devices after having received said temporary bus release request from said one of said external devices, said CPU cannot re-acquire said bus utility right from said DMA controller until said one of said external devices has sent said withdrawal request to said DMA controller.

11. A direct memory access controller (DMA) for a data processing system having a central processing unit (CPU), memories, external devices, and buses for alternately connecting between said memories, said CPU, and said external devices, said DMA controller comprising:

an acceptance circuit for receiving a temporary bus release request transferred from one of said external devices in order to permit use of said buses during an execution of a bus transfer cycle under a condition that said DMA controller has acquired a bus utility right from said CPU, and for receiving a withdrawal request of said temporary bus release request transferred from said one of said external devices;

a transfer control circuit for storing transfer parameters relating to said execution of said bus transfer cycle when said acceptance circuit receives said temporary bus release request transferred from said one of said external devices, for interrupting said bus transfer cycle in order to temporarily release said buses for said one of said external devices when a current cycle in said bus transfer cycle is completed, and for executing again said bus transfer cycle from a cycle immediately after said current cycle of said bus transfer cycle; and a release ordering circuit for permitting a temporary bus release to said one of said external devices after said bus transfer cycle has been interrupted by said transfer control circuit, and for indicating a prohibition of a use of said buses to said one of said external devices when said bus transfer cycle which has been interrupted by said transfer control circuit is re-started, wherein said transfer control circuit executes again said bus transfer cycle only when said acceptance circuit receives said withdrawal request of said temporary bus release request transferred from said one of said external devices.

12. The DMA controller as claimed in claim 11, wherein said interruption of said bus transfer cycle executed by said transfer control circuit is implemented by setting said buses to a high impedance state in order to disconnect said buses from said DMA controller.

13. The DMA controller as claimed in claim 11, wherein said buses include an address bus, a data bus, and control lines.

14. The DMA controller as claimed in claim 13, wherein said transfer control circuit interrupts said bus transfer cycle by setting said buses to a high impedance state in order to disconnect said buses from said DMA controller.

15. The DMA controller as claimed in claim 11, wherein said external devices include memories and I/O devices.

16. The DMA controller as claimed in claim 11, wherein said one of said external devices which has transferred said temporary bus release request is a display control circuit which drives a CRT.

17. The DMA controller as claimed in claim 11, wherein said one of said external devices which has transferred said temporary bus release request is a memory refresh control circuit to refresh a main memory connected with a system bus.

18. A direct memory access controller (DMA) for a data processing system having a central processing unit (CPU), memories, external devices, and buses for alternately connecting between said memories, said CPU, and said external devices, said DMA controller comprising:

an acceptance circuit for receiving a temporary bus release request transferred from one of said external devices in order to permit use of said buses during an execution of a bus transfer cycle under a condition that said DMA controller has acquired a bus utility right from said CPU, and for receiving a withdrawal request of said temporary bus release request transferred from said one of said external devices;

a transfer control circuit for storing transfer parameters relating to said execution of said bus transfer cycle when said acceptance circuit receives said temporary bus release request transferred from said one of said external devices, for interrupting said bus transfer cycle in order to temporarily release said buses for said one of said external devices when a current cycle in said bus transfer cycle is completed, and for executing again said bus transfer cycle from a cycle immediately after said current cycle of said bus transfer cycle; and a release ordering circuit for permitting a temporary bus release to said one of said external devices after said bus transfer cycle has been interrupted by said transfer control circuit, and for indicating a prohibition of a use of said buses to said one of said external devices when said bus transfer cycle which has been interrupted by said transfer control circuit is re-started, wherein said transfer control circuit executes again said bus transfer cycle only when said acceptance circuit receives said withdrawal request of said temporary bus release request transferred from said one of said external devices, and wherein when said CPU requests to re-acquire said bus utility right after said CPU has given said bus utility right to said DMA controller and said DMA controller has permitted said temporary bus release to said one of said external devices after having received said temporary bus release request from said one of said external devices, said CPU cannot re-acquire said bus utility right from said DMA controller until said one of said external devices has sent said withdrawal request to said DMA controller.

* * * * *